United States Patent [19]

Gelardi et al.

[11] Patent Number: 5,284,243
[45] Date of Patent: Feb. 8, 1994

[54] INSERTABLE TRAY FOR PROVIDING A MULTIPLE DISC CONTAINER

[75] Inventors: Anthony L. Gelardi; John A. Gelardi, both of Kennebunkport, Me.

[73] Assignee: Lakewood Industries, Inc., Pittsfield, Mass.

[21] Appl. No.: 964,066

[22] Filed: Oct. 21, 1992

[51] Int. Cl.$^5$ .................................................. B65D 85/57
[52] U.S. Cl. .................................. 206/310; 206/312; 206/444; 220/339
[58] Field of Search .......................... 206/309–313, 206/444; 220/339

[56] References Cited

U.S. PATENT DOCUMENTS

| | | |
|---|---|---|
| 4,327,831 | 5/1982 | Inaba et al. |
| 4,387,807 | 6/1983 | de la Rosa |
| 4,535,888 | 8/1985 | Nusselder |
| 4,702,369 | 10/1987 | Philosophe ........................ 206/312 |
| 4,778,047 | 10/1988 | Lay |
| 4,793,480 | 12/1988 | Gelardi et al. |
| 4,867,302 | 9/1989 | Takahashi |
| 5,168,991 | 12/1992 | Whitehead ........................ 206/310 |

FOREIGN PATENT DOCUMENTS

0420350  4/1991  European Pat. Off. ............ 206/310

Primary Examiner—Bryon P. Gehman
Attorney, Agent, or Firm—James C. Wray; William F. Mufatti

[57] ABSTRACT

The present invention provides an insertable compact disc tray for standard single CD jewel boxes. The tray allows for conversion to multiple disc retention and has first and second sides with rosettes, for examples, for engaging and for holding first and second CDs. The tray has a shelf which fixedly attaches between first and second outer hinges of the box, and an attached leaf. A living hinge is provided between the shelf and the leaf for allowing rotational movement therebetween, with the user accessing the oppositely mounted CDs through rotation of the leaf around the living hinge. Upward rotation of the leaf allows for the insertion of a graphics card under the shelf and tray before or after the shelf and tray are inserted in the box. The shelf traps and holds the upper edge of the graphics card end and cooperates to hold the graphics card in fixed position during raising and lowering of the cover and the tray.

20 Claims, 5 Drawing Sheets

INSERTABLE TRAY FOR PROVIDING A MULTIPLE DISC CONTAINER

BACKGROUND OF THE INVENTION

The present invention relates to compact disc containers, typically known as CD jewel boxes. Specifically, the present invention relates to CD retaining jewel boxes capable of holding more than one compact disc.

Prior art multiple disc containers have taken several forms. One popular multiple disc storage container has an unmovable center leaf having upper and lower rotatable leaves, which rotate upon upper and lower hinges and close upon the center leaf to store up to four compact discs. Another provides a photo album-type container having flexible leaves which can be insertable and which engage discs. However, both of those apparatuses are extremely bulky and are not compatible in thickness with the present single disc jewel boxes. A need exists for forming a compact disc container which is the same size as single disc containers, but which is capable of holding two discs. A need also exists for a means of converting standard single disc jewel boxes covers and bases into multiple disc jewel boxes without having to alter these standard pads.

SUMMARY OF THE INVENTION

In a preferred embodiment, a jewel box, or an insert for a standard jewel box, incorporates a snap-in shelf with a living-hinged leaf having first and second oppositely extending rosettes for engaging first and second CDs. The shelf has solid ribs with first and second lugs having opposite protrusions for snapping into the hinge openings of the jewel box. The shelf is fixed in position and provides minimal, if any, rotation, while a longitudinal living hinge provided along one edge allows rotation of the leaf. The leaf has upper and lower trays on opposite sides for accommodating the CDs. The CD and rosette on the lower tray are accessed through movement of the leaf about the hinge. A preferred jewel box accepts a standard insert card.

An insertable tray holding multiple discs within a storage container has a leaf with first and second opposite sides. Each side incorporates a disc engagement means, and a shelf is connected along one edge of the leaf. The shelf incorporates attachment means for attaching to the storage container. A longitudinal living hinge is provided between the shelf and the leaf for providing rotational movement therebetween. The shelf and attached leaf are snapped into the container proximal a hinge between the container lid and container base. The user can access CDs engaged on the first or second sides by rotating the leaf within the open container.

The first and second engagement means are first and second oppositely extending rosettes for engaging center holes of discs.

The attachment means between the shelf and the container is preferably provided at a hinge between the front edge of the shelf, the lid and base of the container.

The attachment means are lugs or snaps provided between first and second ends of the shelf and first and second hinges of the container.

The leaf is approximately square in shape, and the shelf extends along one side of the approximate square with the living hinge provided therebetween. The shelf and attached leaf are sized to fit within a standard compact disc jewel box container with first and second snaps provided on first and second side edges of the shelf for snapping into the hinges between the lid and the base of the jewel box container.

The first and second sides of the leaf can have first and second respective nesting means for nesting the disc while it is engaged by the engagement means.

In a preferred embodiment, the living hinge is a longitudinal divot provided between the shelf and the leaf.

Longitudinal ribs can preferably be provided on the shelf for reinforcing the shelf.

In one preferred embodiment, the shelf is provided along one edge of the leaf, and has an upwardly extending portion extending upwards from the one side of the leaf at the edge. An adjacent flattened elevated portion extends oppositely and approximately parallel to the side. The shelf further incorporates downwardly extending reinforcement ribs extending downward from the elevated portion to provide rigidity to the shelf and to reinforce first and second shelf attachment means provided on first and second opposite sides of the shelf. The first and second attachment means can be end plates having outward protrusions which mate with and snap into hinge indentations provided on the hinges of the container between the lid and the base.

Preferably the longitudinal hinge is provided on the shelf between the elevated portion and the upwardly extending portion.

One multiple disc container of the present invention is a container for compact discs utilizing a standard base and rotatably mounted lid, which rotates 180° with respect to the base on first and second opposite hinges provided along opposite sides of the base and lid adjacent an edge between the sides. An insertable tray has a leaf and an attached shelf. The shelf extends along one side of the leaf and fits between the first and second hinges of the jewel box and non rotatably attaches thereto. A longitudinal living hinge is provided proximal the connection between the shelf and the leaf for providing a rotatable attachment therebetween. The leaf nests within the base and has upper and lower sides with upper and lower disc engagement means. The user has access to either the upper or lower disc by rotating the leaf around the longitudinal hinge between first and second rotated positions.

The shelf has first and second opposite sides which connect to first and second opposite hinges of the jewel box. The shelf extends on the base a distance from the axis of rotation of the container hinges to thereby space the longitudinal living hinge from the axis of rotation.

The first position is provided when the leaf is resting on the base, and the second position is provided when the leaf is rotated 180° around the living hinge with respect to the base.

In a preferred embodiment, the CD engagement means are rosettes for engaging the center holes of CDs.

The jewel box can have at least one retaining means for retaining inserted graphical and literary media.

The new tray does not interfere with conventional graphics. Graphics cards can be inserted before or after the tray is inserted into the jewel box. The non movable portion of the tray locks a graphics card into position in the base. The graphics card remains fixed in the base during movement of the cover and tray.

These and further and other objects and features of the invention are apparent in the disclosure, which

DETAILED DESCRIPTION OF THE DRAWINGS

Figure 1:
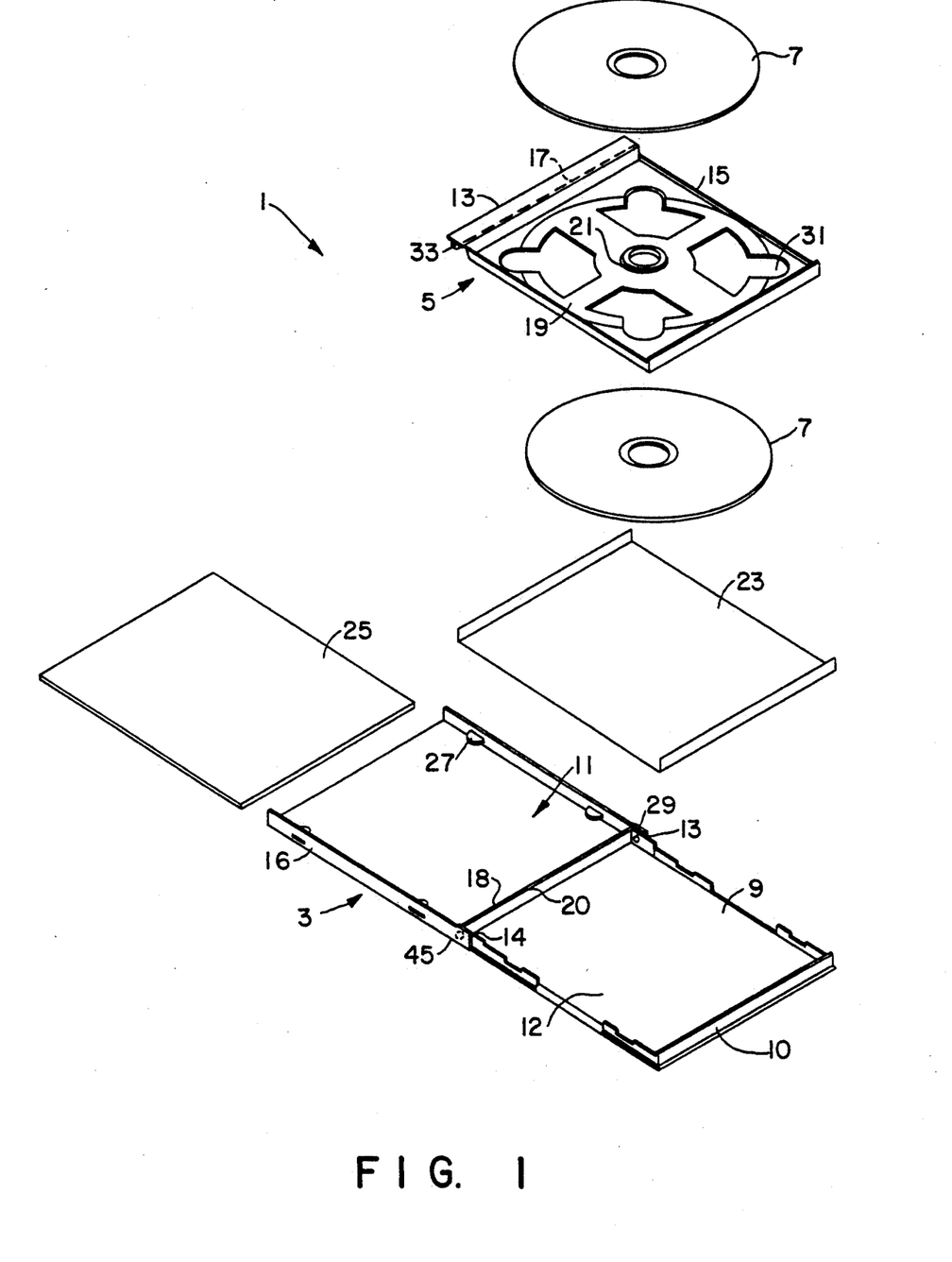
FIG. 1 is an elevated perspective showing the disassembled jewel box, insert cards, insertable multiple disc tray and discs.

A preferred multiple disc tray of the present invention is generally indicated by the numeral 1 in FIG. 1. A standard jewel box 3 has a base 9 with raised edges 10 forming a nest 12, typically used for fixedly nesting a CD engaging tray. The base 9 is hinged at first and second opposite hinges 13 and 14 to the lid or cover 11. The lid 11 preferably has downward protrusions 16 which are complementary to the raised edges 10 of the base, with the hinges 13 and 14 being mated structures between the raised edges 10 and the downward protrusion 16 proximal the adjacently joined edges 18 and 20 of the jewel box.

In a preferred embodiment, the mated hinge structures 13 and 14 are lugs 45 extending inward into apertures or indentations 29 in the raised edges 10 of the base. The lugs fit within the apertures 29 and form the axis of rotation of the lid on the base.

A multiple disc retaining tray, generally indicated by the numeral 5, incorporates a generally flat leaf 15 attached to a shelf 13, which is formed along one side of the leaf 15. The shelf 13 preferably has first and second attachment means 33, which mate with the apertures 29 to fixedly attach the shelf within the base along the back edge 20, and partially into the base nesting area 12. A longitudinal hinge 17 is provided between the leaf 15 and the shelf 13 to provide an axis of rotation therebetween. It is preferable that the engagement between the shelf and the base provide no movement or revolution. A preferred engagement is a snap engagement, which allows for insertion of a tray into a standard single CD jewel box.

The tray 5 preferably has upper and lower sides for engaging CDs 7. Engagement means 21 are provided to hold the CDs on the leaf. A preferred engagement means is a rosette 21 provided for engaging the center hole of a CD. The CD is nested within a CD nest 19 and is held securely by the rosette 21. Finger holes 31 are preferably provided in the tray for allowing the user to grasp outer edges of the CD for removal from the rosette.

At least one retaining means 27 is provided on the jewel box and/or tray for holding graphics or information cards 25 pertinent to the CD to be stored.

Figure 2:
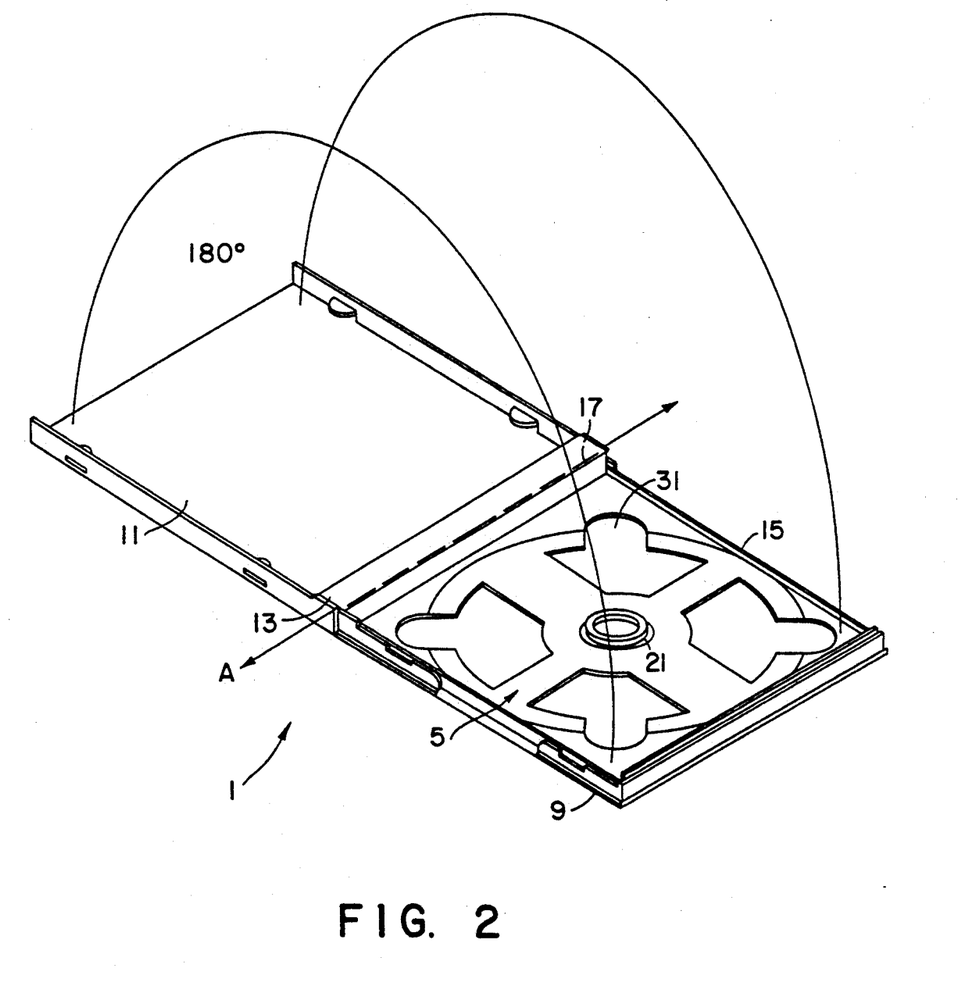
FIG. 2 shows an elevated perspective of the inserted tray with 180° rotations around axis A.

In FIG. 2, the multiple disc CD container 1 has the tray 5 inserted and held onto the base through the attachment of the shelf 13 to the jewel box hinges. The longitudinal living hinge 17 is provided proximal the mating of the shelf and the leaf 15, and an axis of rotation A allows for rotation of the leaf 15 180° for accessing a lower side (not shown) of the leaf. During the rotation of the leaf, the lid 11, base 9 and attached shelf 13 remain stationary.

Figure 3:
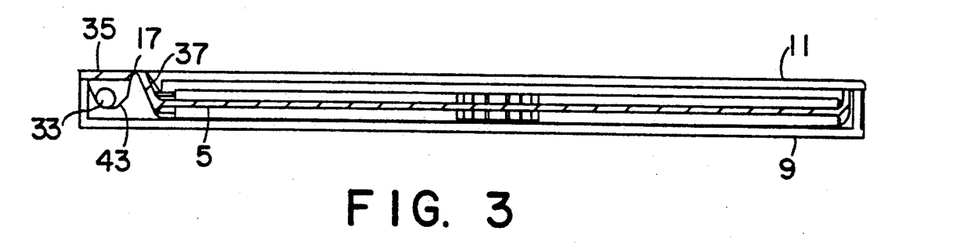
FIG. 3 shows a side cross-section with the tray inserted into the jewel box, with the outwardly extending lug or snap for mating with jewel box hinge aperture.

FIG. 3 shows the inserted tray 5 and closed jewel box. The lug or protrusion 33 is shown extending outward from a side plate 43, which extends downward from both sides of the shelf. In a preferred embodiment, the shelf incorporates a longitudinal upward extending portion 37 which extends upward from the leaf 5, and an elevated portion 35 which extends away from the leaf and provides a spaced relationship between the jewel box hinge and the living hinge 17.

Figure 4:
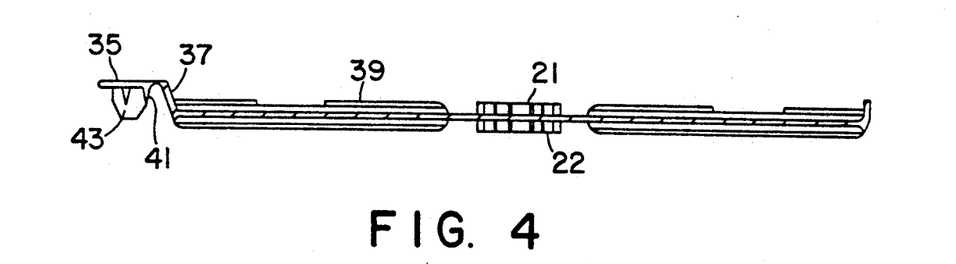
FIG. 4 is a cross-section of the tray showing upper and lower nesting means and oppositely extending rosettes.

In FIG. 4, longitudinal ribs 41 provide reinforcement for the shelf to maintain rigidity. The tray 5 preferably incorporates ridges 39 which prescribe the nesting areas, and centrally located oppositely extending rosettes 21 and 22 ar provided for engaging the nested CDs.

Figure 5:
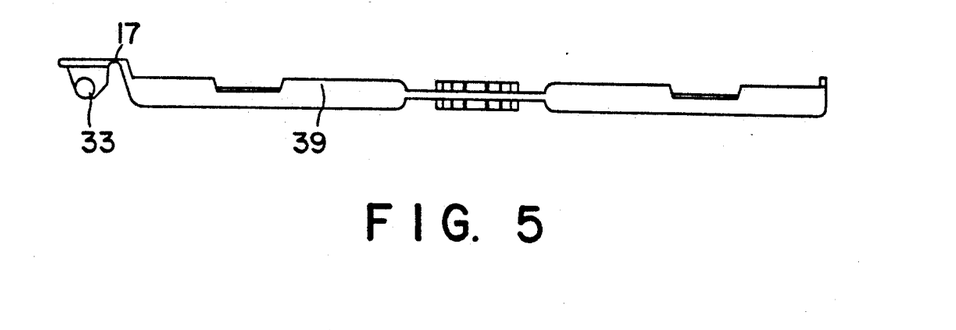
FIG. 5 is a side view of the tray.

FIG. 5 shows a side view of the tray prior to insertion into the jewel box.

Figure 6A:
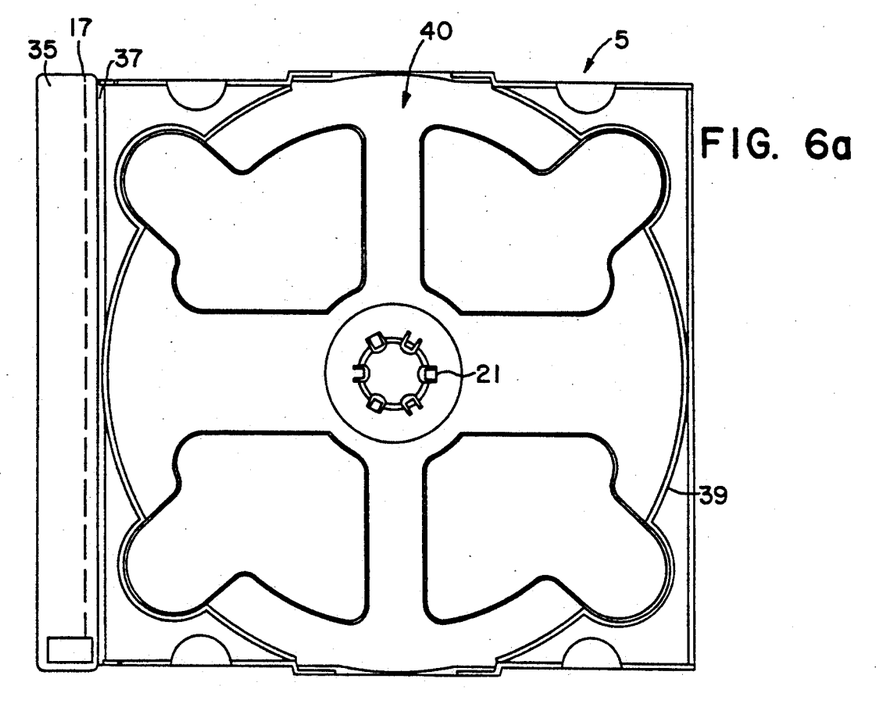
FIG. 6a is a top view showing the upper side of the tray.
Figure 6B:
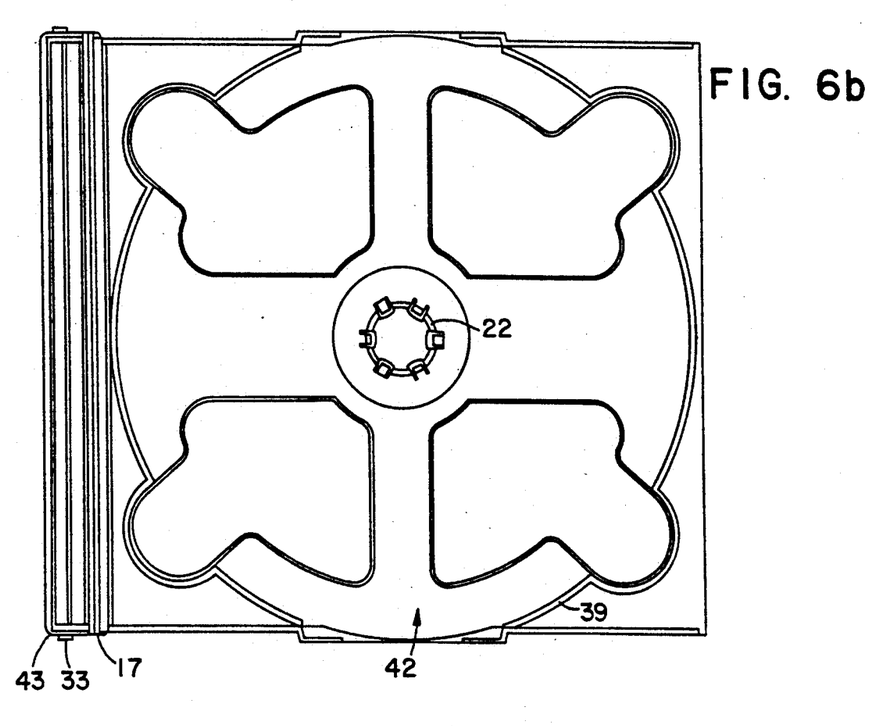
FIG. 6b is a top view showing the lower side of the tray with detail of the hinge.

FIGS. 6a and 6b show preferred upper and lower sides 40 and 42 of the leaf 5 In FIG. 6b the longitudinal hinge 17 is shown as a longitudinal divot or indentation which prescribes a natural point of rotation between the leaf and the shelf. In a preferred embodiment, this hinge is provided between the raised portion 37 and the elevated portion 35 of the shelf. The lugs 33 are shown extending outwards from the downwardly extending plate 43.

Figure 7:
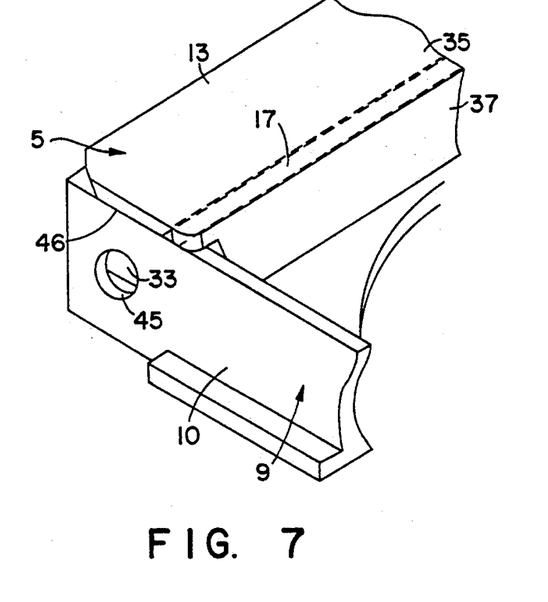
FIG. 7 is an elevated perspective showing detail of the inserted tray with mated lug and aperture.

FIG. 7 shows an elevated view showing detail of the mating between the shelf 13 and the hinge aperture 29 of the base. The lug 33 snaps within the aperture 29 and is held fixedly therein. A lower edge 46 of the shelf 13 rests on the upraised edges 10 of the base 9, thus preventing rotational movement of the elevated portion of the shelf while allowing rotational movement of the leaf at the longitudinal hinge 17.

Figure 8A:
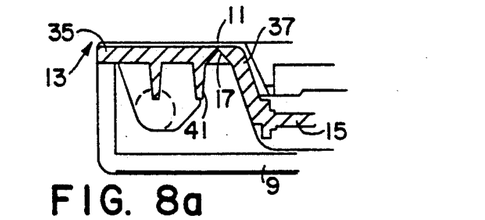
FIG. 8a is a cutaway side view showing detail of the inserted tray with reinforcement ribs.
Figure 8B:
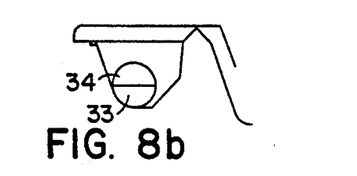
FIG. 8b is a side view giving detail of the hinge and a preferred lug extension.
Figure 8C:
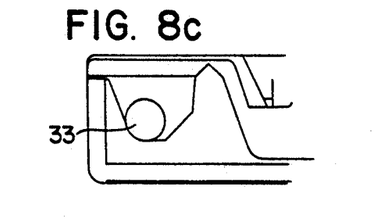
FIG. 8c is a side detail showing the inserted tray.

A cutaway side view of the shelf is shown in FIG. 8a, with the lid 11 closed on the base 9. Longitudinal ribs 41 provide stability for the shelf 13, and the hinge 17 longitudinally cuts across the elevated portion 35 proximal the upwardly extending portion 37. FIGS. 8b and 8c show preferred lug arrangements. In FIG. 8b, the lug 33 can have an extension 34 which allows for relatively easy installation but difficult removal.

Figure 9A:
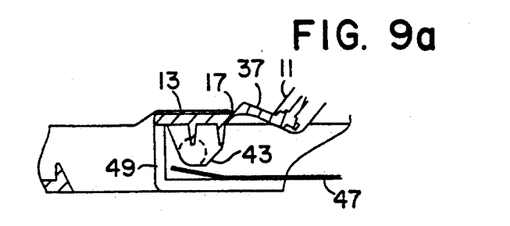
FIGS. 9a, 9b and 9c show the insertion and retention of a graphics or information card under the tray. This is a major improvement over existing two-pack trays.
Figures 9B, 9C, 10B, 10C:
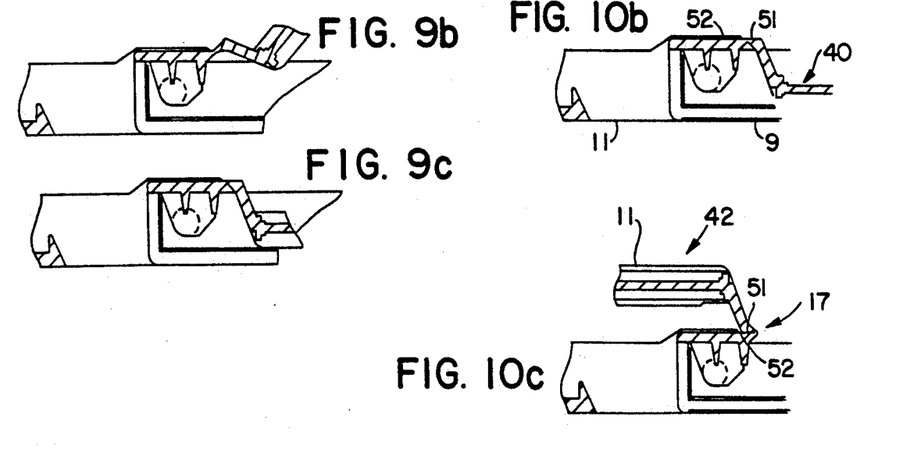
FIG. 10b shows the inserted tray with the lid open and the disc on the upper side of the tray available to the user.
FIG. 10c shows the tray rotated to expose the disc on the lower side of the tray.

FIGS. 9a–9c show installation of an insert card 47 behind the plate 43, with the back wall 49 of the base forming a stop and the plate 43 forming a retention means for holding the card in place on the base. As the jewel box is typically made of a clear plastic material, the card 47 shows through the base to reveal graphics or information pertinent to the CD to be held. The graphics card may be inserted after positioning of the tray or before positioning the tray. The fixed portion of the tray holds the end of the graphics card. A very important advantage is the provision of the ability of graphics card insertion with or without preliminary tray insertion. Partial rotation of the leaf 11 and upwardly extending portion 37 around the hinge 17 relative to the non movable elevated portion 35 of the shelf 13 and jewel box is shown in FIG. 9a.

Figure 10A:
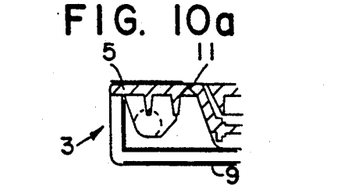
FIG. 10a shows the inserted tray with the closed lid.

Advantages of the present invention are shown in FIGS. 10a-10c. The insert or tray 5 is inserted into a standard single CD jewel box, allowing conversion of existing stocks of jewel boxes from single to double, or vice versa, as needed by CD container suppliers. FIG. 10a shows the inserted tray 5 and closed container 3. To access the upper CD first, the user rests the container 3 on the base 9 and opens the lid 11 to expose the upper face or side 40. Without touching the container, the user can access the lower face or side 42 by simply revolving the leaf 11 around the hinge 17 180°, so that the lower face is facing up. The abutment of adjacent shelf faces 52 and 51 next to the hinge stops the rotation of the leaf from going beyond 180°, and holds the lower face roughly parallel to the lid until the user returns the leaf to the original upward face-up position. Alternatively, the user can access the bottom side 42 first by resting the lid face down and opening the base upwards with respect to the lid. Because of the hinge, the leaf 11 stays bottom side up, regardless of the rotation of the base and fixed shelf.

The present invention provides great cost advantages to suppliers and user, as it enables conversion from single to double disc retention and likewise without replacement of existing standard compact disc jewel box containers. The insertable tray can be made of inexpensive materials, such as polypropylene, and can be molded in simple processes, thus keeping material and production costs low. The trays can be sold in conjunction with the CD boxes, or separately for insertion by the user.

Though the lug and aperture mating of the shelf and base is a preferred embodiment of the invention, other non rotatable attachment means are within the scope of the present invention.

While the invention has been described with reference to specific embodiments, modifications and variations of the invention may be constructed without departing from the scope of the invention, which is defined in the following claims.

We claim:

1. An insertable tray for holding multiple discs within a storage container having a container lid and a container base, comprising a leaf having first and second opposite sides, each side incorporating a disc engagement means for engaging and holding a disc, and a connected shelf, the shelf having attachment means for attaching to a said storage container that allows for insertion of a graphics card when snapped into a jewel box, a longitudinal living hinge provided between the shelf and the leaf for providing rotational movement therebetween, wherein the leaf and attached shelf are snapped into a holding compact discs proximal a hinge between the container lid and container base, and further wherein a compact disc engaged on the first or second sides can be accessed by rotating the leaf within the open container.

2. The storage container of claim 1, wherein each engagement means is an extending rosette for engaging a center hole of a disc.

3. The storage container of claim 1, wherein the attachment means between the shelf and the container is a nonmovable attachment provided at the hinge between the lid and base of the container.

4. The storage container of claim 3, wherein the attachment means are snaps provided between first and second ends of the shelf and first and second hinges of the container.

5. The storage container of claim 1, further comprising the leaf being approximately square in shape, wherein the shelf extends along one side of the approximate square with the living hinge provided therebetween, the shelf and attached leaf sized approximately to fit within a standard compact single disc jewel box container with first and second snaps provided on first and second side edges of the shelf for snapping into the hinges between the lid and the base of the jewel box container.

6. The storage container of claim 1, further comprising the first and second sides of the leaf incorporating first and second respective nesting means for nesting a compact disc while it is engaged by the engagement means.

7. The storage container of claim 1, further comprising the living hinge being a longitudinal divot provided between the shelf and the leaf.

8. The storage container of claim 1, further comprising longitudinal ribs provided on the shelf for reinforcing the shelf.

9. The storage container of claim 1, further comprising the shelf provided along one edge of the leaf, the shelf having an upwardly extending portion extending upwards from the leaf at the edge thereof, and an adjacent flattened elevated portion extending oppositely and approximately parallel to the side, the shelf further incorporating downwardly extending reinforcement ribs extending downward from the elevated portion to provide rigidity to the shelf and to reinforce first and second shelf attachment means provided on first and second opposite sides of the shelf for attaching the shelf to the storage container.

10. The storage container of claim 9, wherein the first and second attachment means are end plates having outward protrusions which mate with and snap into hinge indentations provided on the hinge of the container between the lid and the base.

11. The storage container of claim 9, wherein the longitudinal living hinge is provided on the shelf between the elevated portion and the upwardly extending portion.

12. A multiple disc storage container comprising a container for compact discs utilizing a standard jewel box having a base and rotatably mounted lid, which rotates 180° with respect to the base on first and second opposite hinges provided along opposite sides of the base and lid adjacent an edge between the sides, an insertable tray incorporating a leaf and a attached shelf, wherein the shelf extends along one side of the leaf and fits between the first and second hinges of the standard jewel box and nonrotatably attaches thereto a longitudinal living hinge provided proximal the attachment between the shelf and the leaf for providing rotation therebetween, the leaf nesting within the base and having upper and lower sides with upper and lower disc engagement means for holding discs within the multiple disc storage container, wherein either an upper or lower held disc can be accessed by rotating the leaf around the longitudinal hiving hinge between first and second rotated positions.

13. The storage container of claim 12, wherein the shelf has first and second opposite sides which connect to first and second opposite hinges of the jewel box, the shelf extending on the base a distance from the axis of rotation of the hinges to thereby space the longitudinal living hinge from the axis of rotation.

14. The storage container of claim 12, wherein a first position is provided when the leaf is resting on the base, and a second position is provided when the leaf is rotated 180° around the living hinge with respect to the base.

15. The storage container of claim 12, further comprising the disc engagement means being rosettes for engaging the center holes of compact discs.

16. The storage container of claim 12, wherein the shelf incorporates a longitudinal upwardly extending portion extending upwards form the first side, and an elevated portion connected to the upwardly extending portion and extending away from the leaf, the elevated portion incorporating reinforcement ribs which extend downward, and further incorporating and plates with attachment means for attaching to the first and second hinges of the jewel box.

17. The storage container of claim 16, wherein the attachment means are protrusions on the end plates extending outwards from the plate for fitting into apertures provided at the hinges, and nonrotatably mating thereto.

18. The storage container of claim 16, wherein the longitudinal hinge is provided between the elevated portion and the upwardly extending portion.

19. The storage container of claim 12, further comprising the jewel box incorporating at least one retaining means for retaining inserted graphical and literary media.

20. The storage container of claim 12, further comprising a base graphics card having a flat central portion and opposite end portions joined to the flat central portion for bending at 90° to the flat central portion, one end portion having an upper edge for positioning beneath the shelf for holding the base graphics card fixed in the base.

* * * * *

UNITED STATES PATENT AND TRADEMARK OFFICE
CERTIFICATE OF CORRECTION

PATENT NO. : 5,284,243
DATED : February 8, 1994
INVENTOR(S) : Anthony L. Gelardi and John A. Gelardi It is certified that error appears in the above-identified patent and that said Letters Patent is hereby corrected as shown below:

```
Claim 1, line 12, after "snapped into a" insert
                  --said storage container for--.

Claim 12, line 7, after "and" delete "a" and insert --an--;
          line 10, after "thereto" insert --,--;
          line 18, delete "hiving" and insert --living--.

Claim 16, line 7, delete "and" (second occurrence)
                  and insert --end--.
```

Signed and Sealed this

Fifteenth Day of December, 1998

Attest:

BRUCE LEHMAN

*Attesting Officer*            *Commissioner of Patents and Trademarks*